United States Patent
Tanaka et al.

(10) Patent No.: US 6,811,851 B2
(45) Date of Patent: Nov. 2, 2004

(54) PROCESS FOR PRODUCING RIDGY RESIN FILM AND RECORDING MEDIUM

(75) Inventors: Mieko Tanaka, Tochigi (JP); Misao Konishi, Tochigi (JP); Satoshi Yanagida, Tochigi (JP)

(73) Assignee: Sony Chemicals Corp., Tokyo (JP)

( * ) Notice: Subject to any disclaimer, the term of this patent is extended or adjusted under 35 U.S.C. 154(b) by 131 days.

(21) Appl. No.: 09/842,824

(22) Filed: Apr. 27, 2001

(65) Prior Publication Data

US 2001/0046202 A1 Nov. 29, 2001

(30) Foreign Application Priority Data

May 1, 2000 (JP) ........................................ 2000-132050
Apr. 25, 2001 (JP) ........................................ 2001-127173

(51) Int. Cl.$^7$ .............................. B32B 3/02; G03C 1/76; G03C 1/492; G03C 1/735; G11B 3/70
(52) U.S. Cl. .................... 428/64.2; 428/64.1; 428/64.4; 428/64.7; 430/270.1; 430/271.1; 430/286.1; 369/288
(58) Field of Search .............................. 428/64.2, 64.1, 428/64.4, 64.7; 430/270.1, 271.1, 286.1; 369/288; 359/495, 497

(56) References Cited

U.S. PATENT DOCUMENTS

| | | | |
|---|---|---|---|
| 4,780,177 A | 10/1988 | Wojnarowski et al. | |
| 5,435,887 A | 7/1995 | Rothschild et al. | |
| 5,723,176 A | 3/1998 | Keyworth et al. | |
| 6,280,660 B1 * | 8/2001 | Takakuwa et al. | 264/1.33 |
| 6,376,040 B1 * | 4/2002 | Usami | 428/64.4 |

FOREIGN PATENT DOCUMENTS

| | | |
|---|---|---|
| EP | 0 247 673 A1 | 12/1987 |
| EP | 0 345 979 A2 | 12/1989 |
| FR | 1 550 199 A | 12/1968 |
| JP | A 7-28084 | 1/1995 |
| WO | WO 98/47140 | 10/1998 |

* cited by examiner

Primary Examiner—Cynthia H. Kelly
Assistant Examiner—L. Ferguson
(74) Attorney, Agent, or Firm—Oliff & Berridge, PLC (57) ABSTRACT

A ridgy resin film made of a resin is formed. On a flat substrate, a first concave and a second concave are formed such as to be spaced a given distance apart from each other. Then, a resin liquid is supplied onto a land being part of the substrate exposed between the first and second concaves. Due to its surface tension, the resin liquid supplied onto the land bulges, and a ridgy resin film even in width is formed by curing the resin liquid in this state. Along the edges of the openings of the first concave and the second concave, ridges are formed. Since the resin liquid is supplied onto the land between the ridges, it does not drip nor overflow.

14 Claims, 5 Drawing Sheets

PROCESS FOR PRODUCING RIDGY RESIN FILM AND RECORDING MEDIUM

BACKGROUND OF THE INVENTION

1. Field of the Invention

The present invention relates to the technical field of plastic molding, particularly to a technique for forming a ridge of a resin in a desired form on a polycarbonate substrate.

2. Description of the Related Art

Hereinafter, a conventional technique for forming a ridgy resin film will be described taking an optical recording medium for example.

Figure 9:
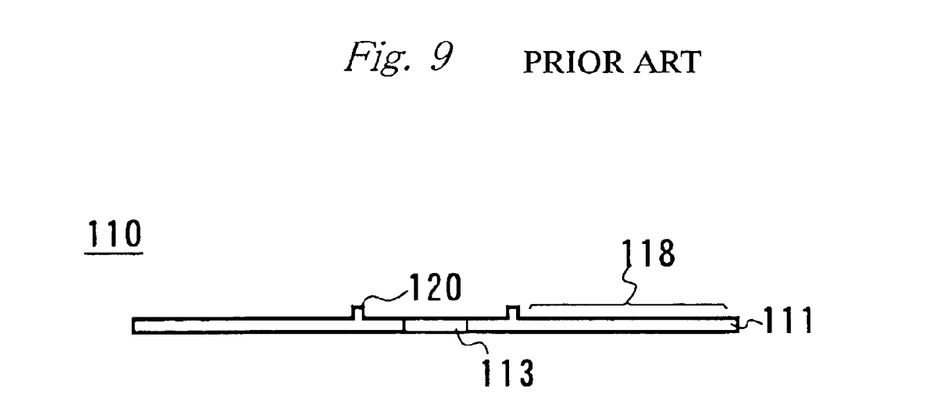
FIG. 9 is a cross-sectional view illustrating a conventional optical recording medium provided with a ridgy resin film.

Reference numeral 110 in FIG. 9 denotes an optical recording medium. The optical recording medium 110 includes a disk-shape substrate 111 made of a transparent resin. A circular hole 113 is provided at the center of the substrate 111.

A recording layer (a reflection film) composed of a metal thin film (a reflection film) and a protective layer for protecting the recording layer are formed on the surface of the substrate 111.

On the back surface of the substrate 111, a resin film 120 constituted of a ridge is formed around the hole 113. The ridgy resin film 120 takes on, as a whole, a ring form, and its center coincides with those of the hole 113 and the substrate 111.

The ridgy resin film 120 and the substrate 111 are formed by injection molding in which a resin is injected into a cavity of a metal mold and then molded. That is, the ridgy resin film 120 and the substrate 111 are molded into a unitary body.

The above-mentioned recording layer is laid outside the ridge of the optical recording medium 110, and the area extending outwardly of the ridge is defined as an information recording area 118. In the information recording area 118, information can be recorded by forming pits or grooves in other than the area where the ridgy resin film 120 has been formed.

A reader which reads out information from the optical recording medium 110 is equipped with a laser beam irradiator, and the optical recording medium 110 is placed on a tray with its ridgy resin film 120 facing downward and inserted into the device such that the recording medium goes above the laser beam irradiator.

With the optical recording medium in this position, the ridgy resin film 120-provided side of the optical recording medium 110 is irradiated with a laser beam. The irradiated laser beam is reflected by the metal thin film and detected to read information recorded thereon.

Since the optical recording medium 110 is placed in such a manner, the ridgy resin film 120 prevents the information recording area 118 from being brought into contact with the tray and consequently being scratched. Moreover, since the surface of the optical recording medium 110 is not brought into tight contact with the tray, ejection of the optical recording medium 110 becomes easier.

However, such a metal mold as is employed in the injection molding described above is expensive, leading to an increase in the production cost of the substrate 111.

Further, forming ridgy resin films in various forms requires the use of metal molds corresponding to their respective shapes.

For forming the ridgy resin film without using a metal mold, there may be proposed a method including applying a resin liquid containing a photoreactive resin onto the surface of the substrate and curing the resin liquid through the irradiation of ultraviolet rays.

However, according to this method, if the viscosity of the resin liquid is high, the resulting ridgy resin film will be wide. Particularly, in the case where the resin liquid is applied in the form of a ring, as described above, since the starting position of resin supply and its end position overlap and the resin liquid is supplied there excessively, the resulting film will be wide only at the point of overlap.

On the other hand, if the viscosity of the resin liquid is low, the resin liquid cannot rise from the surface of the substrate and therefore the surface of the resulting ridgy resin film will be lowered.

In any case, in the technique of applying the resin liquid, it is difficult to form a ridgy resin film which rises for a sufficient height and has an even width.

SUMMARY OF THE INVENTION

The present invention was made to solve the above-described problems faced in the prior art. An object of the present invention is to provide a process for forming a ridgy resin film uniform in width without using a mold, particularly a ring-shape ridgy resin film which is uniform in width.

For solving the above-mentioned problems, the present invention is a process for forming a ridgy resin film, comprising the steps of: forming a first concave and a second concave on a surface of a plate substrate to make an area between the first and second concaves as a resin film formation area; supplying a resin liquid containing a photopolymerizable resin onto a surface of the resin film formation area to form a resin liquid layer consisting the resin liquid; and curing the resin liquid layer to form a ridgy resin film.

The present invention is the process for forming a ridgy resin film, wherein the resin liquid layer is cured by irradiation with ultraviolet rays.

The present invention is the process for forming a ridgy resin film, wherein during the step of forming the first concave and the second concave, a boundary between the resin film formation area and the first concave and that between the resin film formation area and the second concave are raised to form ridges, and the ridgy resin film is formed between the ridges.

The present invention is the process for forming a ridgy resin film, wherein the first and second concaves are formed by scraping the surface of the substrate by pressing an excavator against the surface of the substrate.

The present invention is the process for forming a ridgy resin film, the first and second concaves are formed by irradiating the surface of the substrate with a laser beam.

The present invention is the process for forming a ridgy resin film, wherein the first and second concaves are formed in concentric relation.

The present invention is the process for forming a ridgy resin film, wherein the viscosity of the resin liquid at 25° C. is not lower than 10 mPa·s nor higher than 1,000 mPa·s.

The present invention is the process for forming a ridgy resin film, wherein the viscosity of the resin liquid at 25° C. exceeds 100 mPa·s.

The present invention is the process for forming a ridgy resin film, wherein the glass transition temperature of the resin forming the ridgy resin film is not lower than 60° C. and below 100° C.

The present invention is the process for forming a ridgy resin film, wherein the height from the surface of the resin film formation area to the surface of the ridgy resin film is 3 µm or higher.

The present invention is a process for producing a recording medium molded in the form of a disk and having a recording layer and a resin layer provided on the recording layer, the process comprising the steps of; forming ring-shaped first and second concaves on a surface of the resin layer with the center of the recording medium as the centers to form an area between the first and second concaves as a resin film formation area; supplying a resin liquid containing a photopolymerizable resin onto the resin film formation; and curing the resin liquid layer to give a ridgy resin film.

The present invention is an optical recording medium molded in the form of a disk and having a recording layer and a resin layer provided on the recording layer, wherein ring-shaped first and second concaves with the center of said recording medium as the centers, a resin film formation area between said first and second concaves, and a ridgy resin film formed in said resin film formation area are formed on a surface of said resin layer, and said ridgy resin film is raised above a surface of said resin layer.

The present invention is the recording medium, wherein the resin layer is made of a polycarbonate resin.

Since the present invention has the structure as described above and the first and second concaves formed on the surface of the substrate are spaced a given distance apart from each other, a ridgy resin film having a predetermined width can be obtained by supplying a resin liquid onto the land between the first and second concaves and then curing the resin liquid supplied.

In the case where the first and second concaves are formed using an excavator or a laser beam, the edges of the openings of the first and second concaves are raised to constitute ridges. Of these ridges, between two ridges adjacent to each other lies a land being part of the substrate, and it is level with the rest of the plane substrate. Even when the resin liquid is supplied onto the land between these two ridges, dripping or overflow of the resin liquid does not take place, for the ridges dam up the flow. Moreover, due to its surface tension, the surface of the resin liquid supplied rises high from the surface of the substrate. By curing the resin liquid in this state, there is provided a ridgy resin film free from dripping or overflow.

A ridgy resin film in the form of, as a whole, a ring is formed by making the first and second concaves in concentraic relation and supplying the resin liquid onto the land therebetween.

Although, at the point of overlap (the juncture of the ring), the resin liquid is supplied in an amount larger than that at any other point, the ridges similarly prevents the resin liquid from overflowing, so that the width of the ring at the juncture will be the same as that at any other point.

According to the process for forming a ridgy resin film of the present invention, it is possible to form a ridgy resin film of a desired form on a surface of an arbitrarily selected substrate.

DETAILED DESCRIPTION OF THE PREFERRED EMBODIMENTS

Hereinafter, the process for forming a ridgy resin film of the present invention will be described with reference to the drawings.

Figure 1A:
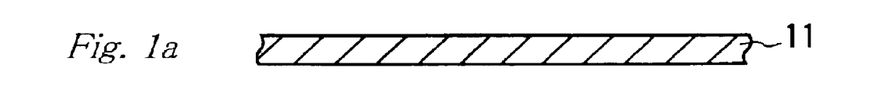
FIGS. 1(a) to 1(h) illustrate a process for producing a ridgy resin film according to present invention.

Reference numeral 11 in FIG. 1(a) denotes a substrate (resin layer) made of a polycarbonate resin.

One surface of the substrate is made flat. In the first step for providing a ridgy resin film on the flat surface of the substrate 11, the substrate 11 is placed horizontally (FIG. 1(a)). Then, an excavator 14 is positioned above the surface of the substrate 11 (FIG. 1(b)) and then its tip 16 is pressed against the flat surface of the substrate 11.

Figure 1B:
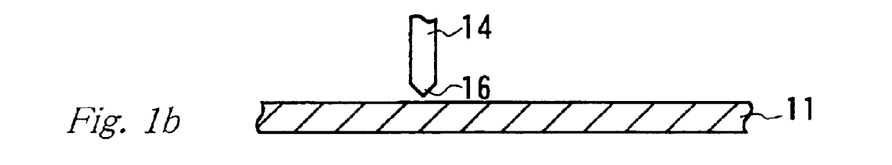

The tip 16 of the excavator 14 is made from a material which is harder than the resin forming the substrate 11. Therefore, by moving the excavator 14 in horizontal direction with its tip 16 pressed against the substrate 11 surface, the surface of the substrate 11 is scraped by the tip 16 to leave a first concave 17a. Here, a groove having a depth of 10 µm is formed in the surface of the substrate 11 as the first concave 17a.

Figure 1C:
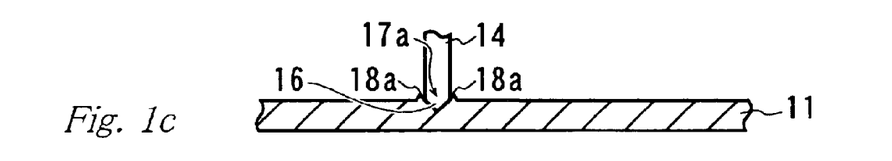

The portion of the resin scooped up from the substrate 11 is removed from the surface thereof, but the remnants pushed out of the openings of the grooves are banked up to make first ridges 18a along the openings of the edges of the first concave 17a (FIG. 1(c)), the ridges 18a being raised above the surface of the substrate 11.

Figure 1D:
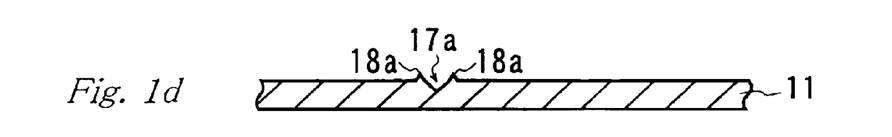

After the first concave 17a of a desired form has been formed in the substrate 11 surface, the tip 16 of the excavator 14 is drawn clear of the surface of the substrate 11 (FIG. 1(d)), and at a point a given distance away from the first concave 17a, the tip 16 is pressed against the substrate 11 again.

By moving the excavator 14 in a direction parallel to the first concave 17a with its tip 16 pressed against the substrate 11, the surface of the substrate 11 is scraped by the tip 16 to leave a second concave 17b. A groove similar to the first concave 17a is formed as the second concave 17b.

Figure 1E:
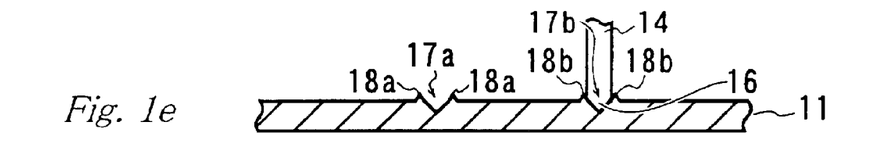

Upon the formation of the second concave 17b, as in the case of the first concave 17a, second ridges 18b are formed on both sides of the openings of the second concave 17b (FIG. 1(e)). Of the lands of the substrate 11, the land between the first and second concaves 17a and 17b constitutes a resin film formation area where a ridgy resin film to be described later is provided.

Figure 1F:
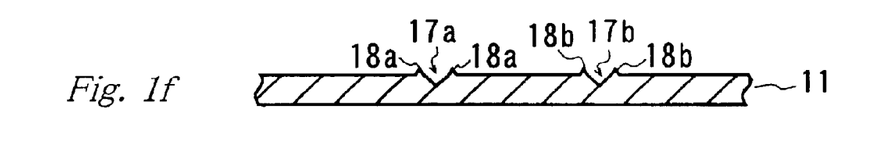

FIG. 1(f) illustrates the excavator 14 withdrawn to a position clear of the substrate 11 after the grooving of the substrate 11.

On the surface of the substrate 11, the first concave 17a and the second concave 17b are spaced a given distance apart. Between the first and second concaves 17a and 17b lies a land being part of the plane substrate 11. The first and second ridges 18a and 18b are provided along the openings of the edges of these first and second concaves 17a and 17b, respectively.

Figure 1G:
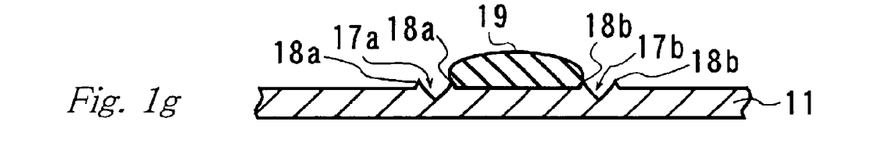

Secondly, a resin liquid containing a photoreactive curable resin is supplied onto the surface of the land being part of the substrate exposed between the first and second concaves 17a and 17b. The resin liquid supplied is dammed up by the first and second ridges 18a and 18b formed along the edges of the first and second concaves 17a and 17b and, the top of the resin liquid, due to its surface tension, is raised high above the lands of the substrate 11. FIG. 1(g) shows the resin liquid in such a state and reference numeral 19 in FIG. 1(g) denotes the resin liquid (resin liquid layer) supplied onto the surface of the substrate 11.

After having been supplied to all over the land between the first and second concaves 17a and 17b, the resin liquid 19 is irradiated with ultraviolet rays to cause the photopolymerizable resin contained in the resin liquid layer 19 to undergo reactions. As a result, the resin liquid layer 19 is cured and a ridgy resin film of a desired form is formed between the first and second concaves 17a and 17b.

Figure 1H:
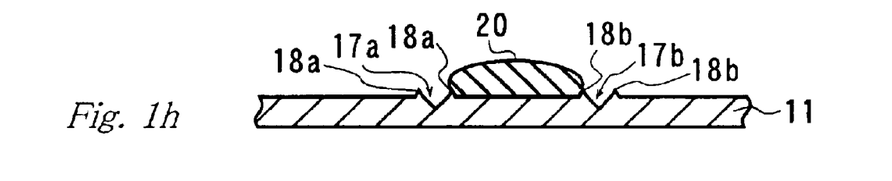

Reference numeral 20 in FIG. 1(h) denotes the ridgy resin film thus obtained. The ridgy resin film 20 lies between the first and second concaves 17a and 17b and rises high above the lands of the substrate 11.

EXAMPLES

The same procedure as illustrated in FIGS. 1(b) and 1(c) was followed to provide, using an excavator, the surface of a polycarbonate substrate with a first concave in the form of a ring, during which, as in the case of the substrate 11 shown in FIG. 1(d), first ridges were formed along the edges of the first concave.

Thereafter, as in the same manner described in FIG. 1(e), an excavator was positioned a given distance away from the first concave, and a second concave was formed so as to be in concentric relation with the first concave, during which, as in the case of the substrate 11 shown in FIG. 1(f), second ridges were formed along the edges of the second concave. In the manner as above described, a plurality of substrates provided with first and second concaves and first and second ridges in concentric relation were prepared.

Then, six kinds of resin liquids each containing a photoreactive curable resin were prepared, and the resin liquids were each separately supplied onto the land between the first and second-concaves formed on each of the substrates prepared above. The viscosities of the resin liquids were, at 25° C., 30 mPa·s, 200 mPa·s, 400 mPa·s, 600 mPa·s, 10 mPa·s, and 1,000 mPa·s.

Each resin liquid was supplied to all over the land between the first and second concaves formed on each substrate such as to form a resin liquid layer 19 raised high above the surface of the substrate as illustrated in FIG. 1(g).

Then, the resin liquids supplied to the substrates were irradiated with ultraviolet rays and cured to give ring-shape ridgy resin films. Test pieces for Examples 1 to 6 were thus prepared.

Moreover, a test piece for Comparative Example 1 was prepared by, as in Examples 1 to 6, supplying a resin liquid having a viscosity of, at 25° C., 5 mPa·s onto the land between the first and second concaves formed on the above-described substrate, and irradiating the resin liquid-supplied surface with ultraviolet rays.

The test pieces for Examples 1 to 6 and Comparative Example 1 prepared above were examined for their "juncture," "dripping, overflow," and "elevation." (Juncture)

For every test piece, the width of the ridgy resin film at the point of overlap (juncture), i.e., the point where the application of the resin liquid starts and ends, was visually examined and compared with that at any other point. The expression "wide" is used when the width of the ridgy resin film at the juncture is wider than that at any other point. When the width of the ridgy resin film at the juncture is almost the same as that at any other point, the film is taken to be "even" in width. The results are shown in Table 1 below.

(Dripping, Overflow)

Every ridgy resin film of the test pieces was examined for dripping or overflow. The results are shown in Table 1 below.

(Elevation)

The height of the ridgy resin film 20 of each test piece was measured. The criteria are as follow.

100 μm or higher: ◎

3 μm to 100 μm: ○

Not higher than 3 μm: X

The results are shown in Table 1 below.

TABLE 1

| | Evaluation test | | | | |
|---|---|---|---|---|---|
| | First and second concaves | Viscosity of resin (mPa · s) | Juncture | Dripping, Overflow | Elevation |
| Example 1 | with concaves | 30 | Even | Not observed | ○ |
| Example 2 | with concaves | 200 | Even | Not observed | ○ |
| Example 3 | with concaves | 400 | Even | Not observed | ◎ |
| Example 4 | with concaves | 600 | Even | Not observed | ◎ |
| Example 5 | with concaves | 10 | Even | Not observed | ○ |
| Example 6 | with concaves | 1000 | Even | Not observed | ◎ |
| Comparative Example 1 | with concaves | 5 | Even | Not observed | X |
| Comparative Example 2 | without concaves | 600 | Wide | Observed | ○ |
| Comparative Example 3 | without concaves | 10 | Wide | Observed | X |

As shown in Table 1, two kinds of resin liquids that are the same as those employed in Examples 4 and 5 were individually applied to the surface of such plane substrates without a first concave nor a second concave as illustrated in FIG. 1(a), in the form of a ring. The resin liquid-applied side of each substrate was irradiated with ultraviolet rays to form a ridgy resin film. Test pieces for Comparative Examples 2 and 3 were thus prepared.

Under the same conditions as in Example 1, the test pieces of Comparative Examples 2 and 3 were examined for "juncture," "dripping, overflow," and "elevation." The results are shown in Table 1 above.

As can be seen from Table 1, in Examples 1 to 6, as compared with Comparative Examples 2 and 3, the width of each ridgy resin film at the juncture was the same as that at any other point, and no dripping nor overflow was observed.

Particularly, in Examples 3, 4 and 6 in which the resin liquids having a viscosity of 400 mPa·s or higher were employed, the height of each ridgy resin film was 100 μm or higher. However, in Comparative Example 2 in which the same resin liquid as that used in Example 4 was employed, since the resin liquid was applied onto the plane substrate with no concave nor ridge, the resin liquid was spread over the surface of the substrate and therefore the height of the resulting ridgy resin film was lower than that in Example 4.

Moreover, in Comparative Example 3 in which the resin liquid having a viscosity of 5 mPa·s was employed, the height of the ridgy resin film was insufficient.

From the results thus obtained, it was found that a ridgy resin film 20 better in configuration was obtained by forming first and second concaves in a surface of a substrate and supplying a resin liquid having a viscosity of, at 25° C., not lower than 10 mPa·s nor higher than 1,000 mPa·s to the land between the first and second concaves.

EXAMPLES

Using five kinds of photoreactive curable resins, resin liquids for Examples 7 to 11 were prepared. For the resin liquids of Examples 7 to 11, viscosity (mPa·s), glass transition temperature (° C.), and surface tension (mN/m) were measured. The viscosity and surface tension were measured at 25° C. The results are shown in Table 2 below.

TABLE 2

| | Evaluation test | | | | |
|---|---|---|---|---|---|
| | Example 7 | Example 8 | Example 9 | Example 10 | Example 11 |
| Viscosity (mPa · s) | 180 | 180 | 180 | 300 | 180 |
| Glass transition temperature (° C.) | 72 | 74 | 64 | 101 | 64 |
| surface tension (mN/m) | 35.6 | 30.1 | 35.3 | 34.4 | 36.2 |
| Percentage of shrinkage upon curing (%) | 8.7 | 8.7 | 8.3 | 8.8 | 8.3 |
| Pendulum hardness (times) | 100 | 100 | 82 | 142 | 82 |
| Pencil hardness | B | B | 3 B | 2 H | 3 B |
| Sirface curability | ○~Δ | ○~Δ | ○ | ○ | Δ |
| PC scratch resistance | Δ | Δ | ○ | X | ○~Δ |
| Blocking properties | Δ | Δ | ○~Δ | ○ | Δ |
| Cracking resistance | Δ | Δ | ○ | X | ○ |
| Ridgy resin film formability | ○ | ○ | ○ | ○ | ○ |

Using the resin liquids of Examples 7 to 11, ridgy resin films were formed under the same conditions as in Examples 1 to 5 to prepare five kinds of test pieces. The resins (resins liquid in cured state) constituting the ridgy resin films of these test pieces were individually examined for pencil hardness, pendulum hardness, and glass transition temperature. Pendulum hardness is measured by a pendulum hardness tester (Könich type model 299; Erichsen) at 25° C.

The results are shown in Table 2 above.

These test pieces were further tested for the following items: percentage of shrinkage upon curing, surface curability, PC scratch resistance, blocking properties, cracking resistance, and ridgy resin film formability. The results are shown in Table 2 above.

[Percentage of Shrinkage Upon Curing]

The specific gravity (g/cm³) of each of the resin liquids of Examples 1 to 6 before curing and that after curing (the specific gravity of the ridgy resin film of the test piece) were measured. With the specific gravity (g/cm³) before curing as A and that after curing as B, the percentage of shrinkage upon curing was figured out by the following mathematical formula (1):

$$(1/A - 1/B)/A \times 100 = \text{percentage of shrinkage upon curing (\%)}$$

[Surface Curability]

The ridgy resin film of each test piece was examined. If the resin liquid was completely cured and the surface of the ridgy resin film was not sticky, the ridgy resin film was graded "○", otherwise it was graded "Δ."

[PC Scratch Resistance]

A resin substrate of polycarbonate (PC) was prepared. The ridgy resin film-formed side of each test piece was pressed against the resin substrate, and the resin substrate was examined for scratches and graded by the following criteria.

No scratch was observed: ○

Some scratches were observed: Δ

Resin substrate was considerably scratched: X

[Blocking Properties]

The ridgy resin film of each test piece was pressed against the surface of the same resin substrate as that employed in PC scratch resistance test. If the ridgy resin film of the test piece was not adhered to the substrate, it was graded "○", otherwise it was graded "Δ".

[Cracking Resistance]

The ridgy resin film of each test piece was examined. If no crack was observed on its surface, it was graded "○", otherwise it was graded "Δ".

[Ridgy Resin Film Formability]

The ridgy resin film of each test piece was examined for dripping and overflow. If neither was observed, it was graded "○", otherwise it was graded "Δ".

As is obvious from Table 2 shown above, in Examples 7 to 11 in which the resin liquids each having a viscosity of 180 mPa·s or higher, a surface tension of 30 mN/m or higher, and a glass transition temperature after curing of 60° C. or higher were employed, a sufficient surface curability was observed, proving their high ridgy resin film formability.

As is obvious from the test results of "pendulum hardness" and "pencil hardness" shown in Table 2, the ridgy resin films of Examples 7 to 9 and 11 each having a glass transition temperature after curing of 100° C. or lower were softer than the resin film of Example 10 the glass transition temperature of which after curing was 101° C. In addition, the ridgy resin films of Examples 7 to 9 and 11 were superior in PC scratch resistance to the resin film of Example 10.

The percentage of shrinkage upon curing of each of the ridgy resin films of Examples 7 to 9 and 11 was lower than that obtained in Example 10. Consequently, their cracking resistance was also good.

The test pieces of Examples 9 and 11 were particularly excellent in surface curability, and their blocking properties were also good.

EXAMPLES

FIGS. 5(*a*) to 5(*e*) illustrate another example of the process for forming a ridgy resin film of the present invention.

As illustrated in FIG. 5(*a*), irradiation of the surface of the same substrate 11 as that employed in Examples above with a laser beam 36 raises the temperature of the laser-irradiated area to melt it.

The molten part of the substrate swells (FIG. 5(*b*)), but a shift of the irradiation position of the laser beam 36 in horizontal direction causes the cooling and contraction of the molten part of the substrate, thereby forming a first concave 37*a*.

Figure 5A:
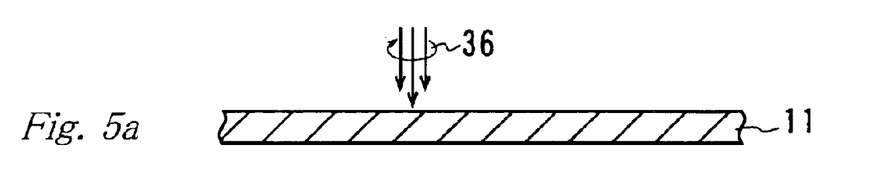
FIGS. 5(a) to 5(e) illustrate another example of a process for producing a ridgy resin film according to the present invention.
Figure 5B:
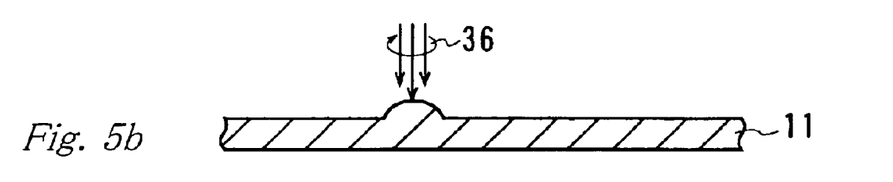
Figure 5C:
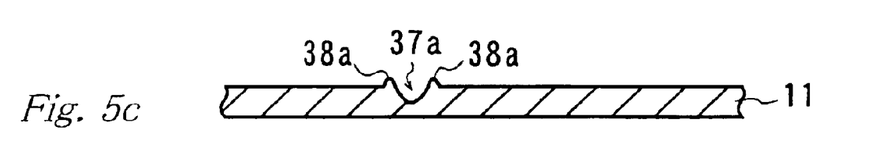

In this step, part of the resin once swelled remains along both of the edges of the openings of the first concave 37a and constitutes first ridges 38a (FIG. 5(c)).

As was described above, the first concave 37a and the first ridges 38a along the edges of the first concave 37a are formed by shifting the irradiation position of the laser beam 36 in horizontal direction.

Figure 5D:
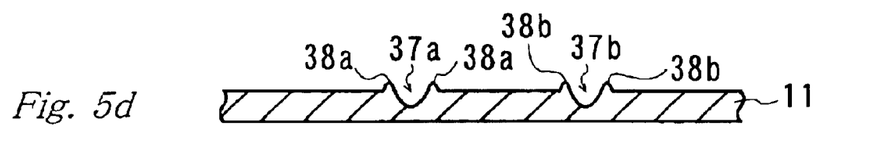

After the irradiation of the laser beam 36 has been suspended and its irradiation position has been shifted by a given distance, the surface of the substrate 11 is re-irradiated with the laser beam 36. By irradiating the substrate with the laser beam 36 while shifting the irradiation position in a direction parallel to the first concave 37a, not only a second concave 37b but also second ridges 38b are formed parallel to the first concave 37a. The ridges 38b are formed along the edge of the second concave 37b.

In the same manner as described in connection with FIG. 1(g), a resin liquid containing a photoreactive curable resin is supplied to all over the surface of the land being part of the substrate 11 exposed between the first and second concaves 37a and 37b to be a resin liquid layer 19 raised above the surface of the substrate 11. (FIG. 5(e)).

Through the irradiation of ultraviolet rays, the resin liquid 19 is cured and, as illustrated in FIG. 1(h), a ridgy resin film is formed between the first and second concaves 37a and 37b on the substrate 11.

The substrate 11 or 51 made of a polycarbonate resin employed above is for the purpose of illustration only and should by no means be construed as defining the scope of the present invention. As the material of the substrate, polyethylene resin and acrylonitrile-butadiene-styrene etc. are also usable.

Moreover, as in Examples 3,4 and 6, the use of a resin liquid having a high viscosity results in the formation of a ridgy resin film 20 which bulges higher from the substrate. Accordingly, adjustment of the viscosity of the resin liquid within the range of 10 mPa·s to 1,000 mPa·s makes it possible to form a ridgy resin film 20 which bulges for an arbitrarily selected distance.

As the photoreactive curable resin contained in the resin liquid, a variety of photoreactive curable resins are available. For example, the photoreactive curable resin may be an acrylic or epoxy resin.

The acrylic resin may be epoxy acrylate, urethane acrylate, ester acrylate or melamine acrylate. The epoxy resin may be alicyclic epoxy resin. The photoinitiators may be used together with the photoreactive curable resin.

Furthermore, a colorant such as a dye and pigment may be added to the resin liquid provided that it does not hinder the photoreactive curable resin from undergoing photopolymerization reactions.

The ridgy resin film 20 of the present invention can be formed on any of a variety of objects of processing. For example, it is possible to decorate the surface of an object of processing with a minute pattern constituted of ridgy resin films 20.

EXAMPLES

Next, description will be given of a case where a ridgy resin film formed in accordance with the present invention is used as an elevation film in the optical recording medium.

Figure 3A:
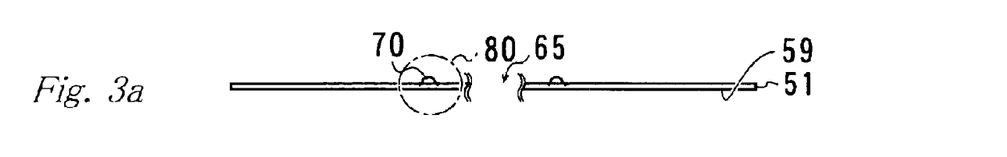
FIGS. 3(a) and 3(b) illustrate a first example of a process for producing an optical recording medium according to the present invention.

Reference numeral 51 in FIG. 3(a) denotes the cross-section of a transparent disk-shape substrate made of a polycarbonate resin. There is a hole 65 at the center of the substrate 51. A predetermined region of the surface of the substrate 51 encircling the hole 65 has already been provided with pits or grooves arrayed so as to represent a sequence of binary numbers.

In the manner described in connection with FIGS. 1(a) to 1(h) or FIGS. 5(a) to 5(e), with the center of the hole 65 as the center, first and second concaves are provided on the substrate 51, i.e., not on the surface with concave and convex pits but on the other side, in concentric relation.

Figure 2:
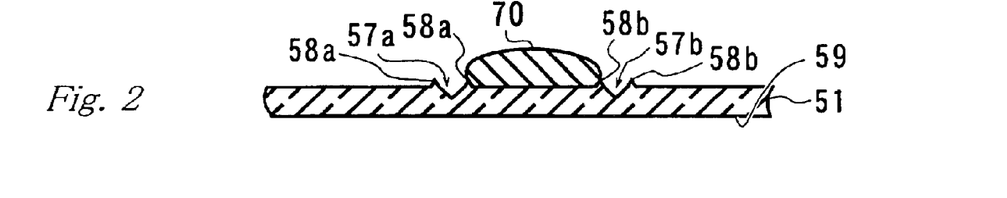
FIG. 2 illustrates an elevation film of an optical recording medium according to the present invention.

FIG. 2 is an enlarged cross-section of part of the left-hand portion of the substrate 51 in the vicinity of the center, the enlarged area being represented by reference numeral 80 in FIG. 3.

First and second ridges 58a and 58b are formed along the edges of the first and second concaves 57a and 57b, respectively. A ridgy resin film 70 lies between the first and second concaves 57a and 57b. In other words, with the center of the hole 65 as the center, the ridgy resin film 70 is formed in concentric relation with the concaves and ridges.

First a recording layer 53 composed of a metal thin film is formed on the surface provided with no ridgy resin film 70 by sputtering. Then a protective layer 55 made of a resin is formed on a surface of the recording layer 53 (FIG. 3(b)).

Figure 4:
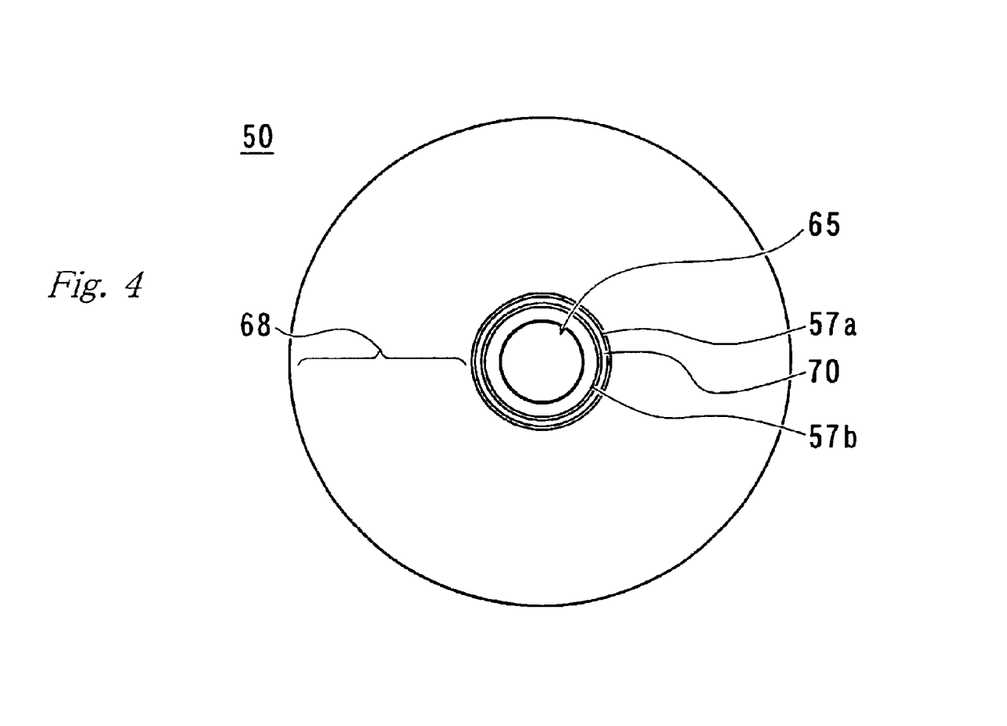
FIG. 4 is a plan view of a substrate of an optical recording medium.

FIG. 4 is a plan view of the substrate 51 in this state.

In the optical recording medium 50, the concave and convex pits representing a sequence of binary numbers are arrayed in the region outside of the ridgy resin film 70, which region is an information recording area 68 where certain data are recorded in the form of concave and convex pits.

In the optical recording medium 50, the ridgy resin film 70 functions as an elevation film. That is, by putting the optical recording medium 50 on the tray of a reader with its ridgy resin film 70-provided side facing downward, the information recording area 68 is prevented from being brought into contact with the tray and consequently protected from scratches. In addition, the presence of the ridgy resin film 70 makes the ejection of the recording medium 50 from the tray easier.

Described above is the case where the recording layer 53 and the protective layer 55 are formed on the substrate 51 previously provided with the ridgy resin film 70 but should by no means be construed as defining the scope of the present invention.

For example, after the recording layer 53 and protective layer 55 have been provided on the surface of the substrate 51 with no ridgy resin film 70, the ridgy resin film 70 is formed not on the surface provided with the recording layer 53 but on the other side in the manner described above. The case where a ridgy resin film is provided on one side of an optical recording medium has been described thus far, but it should by no means be construed as defining the scope of the present invention. Ridgy resin films may be provided on both sides of the optical recording medium.

Described above is the case where the optical recording medium 50 is produced by forming the recording layer 53 and the protective layer 55 on the substrate 51 previously provided with the ridgy resin film 70 but should by no means be construed as defining the scope of the present invention.

Figure 6A:
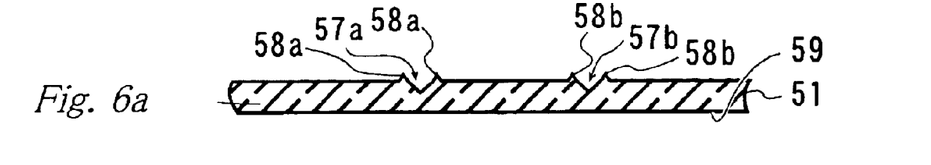
FIGS. 6(a) to 6(c) illustrate a second example of a process for producing an optical recording medium according to the present invention.
Figure 6B:
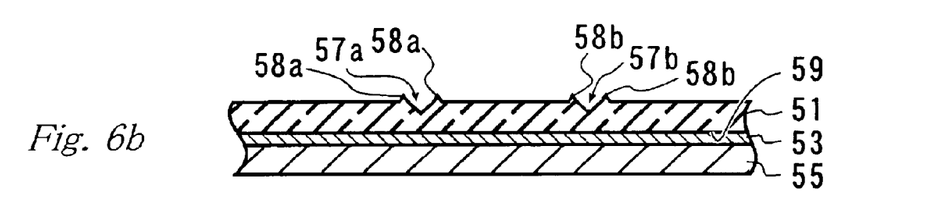
Figure 6C:
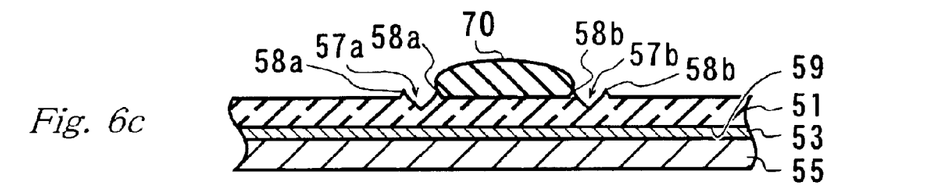

The second example of the process for producing the optical recording medium of the present invention will be described with reference to FIGS. 6(a) to 6(c). Firstly, following the same process as illustrated in FIGS. 1(a) to 1(f) or FIGS. 5(a) to 5(d), first and second concaves 57a and 57b are formed on the same substrate 1 as that employed in the case of the above-described optical recording medium 50.

Figure 3B:
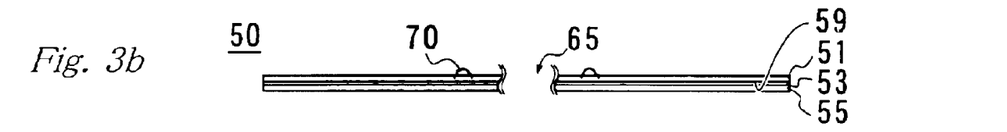
Figure 5E:
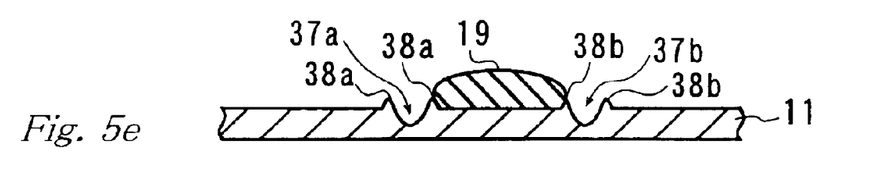

Secondly, in the manner described in connection with FIGS. 3(a) and 3(b), a recording layer 53 and a protective layer 55 are formed not on the side provided with the first and second concaves 57a and 57b but on the other side of the substrate 51 (i.e., on the surface 59 with concave and convex pits). Thereafter, the resulting substrate is subjected to the steps as illustrated in FIGS. 1(g), 1(h) or FIG. 5(e) to form a ridgy resin film 70. As a result, there is obtained an optical recording medium 50 of the present invention.

Figure 7A:
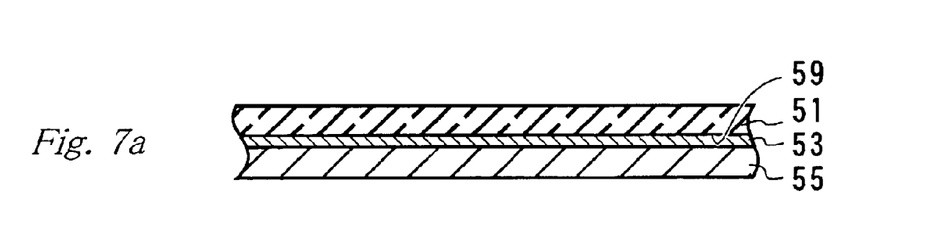
FIGS. 7(a) and 7(b) illustrate a third example of a process for producing an optical recording medium according to the present invention.
Figure 7B:
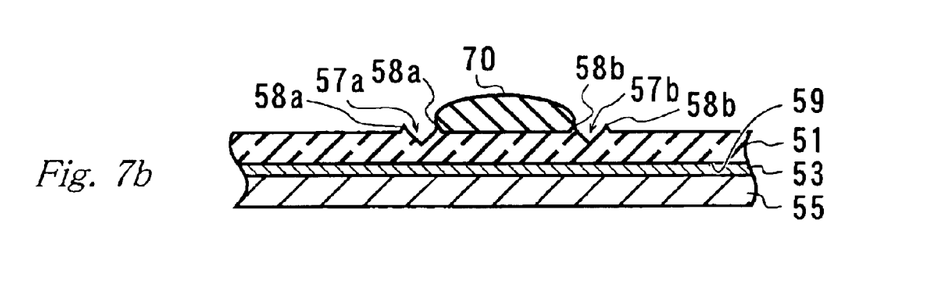

The third example of the process for producing the optical recording medium of the present invention will be described with reference to FIGS. 7(a) and 7(b). Firstly, before first and second concaves 57a and 57b are formed, a surface 59 with concave and convex pits on a substrate 51 is provided with a recording layer 53 and a protective layer 55 (FIG. 7(a)).

Then, according to the process as illustrated in FIGS. 1(a) to 1(h) or FIGS. 5(a) to 5(e), a ridgy resin film 70 is formed not on the pits-provided surface 59 but on the other side of the substrate to provide an optical recording medium 50 of the present invention.

The case of forming a ridgy resin film on one surface of the optical recording medium has been described thus far, but it should by no means be construed as defining the scope of the present invention.

Figure 8:
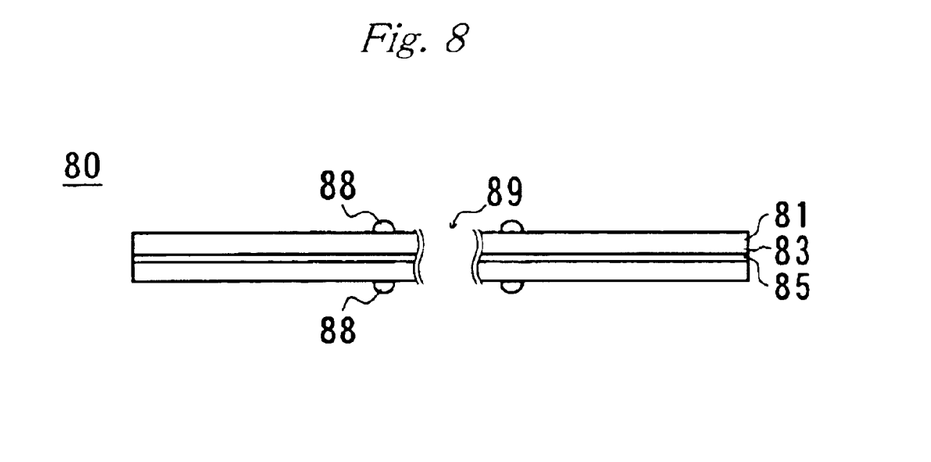
FIG. 8 illustrates another example of an optical recording medium according to the present invention.

Reference numeral 80 in FIG. 8 indicates another embodiment of the optical recording medium of the present invention. The optical recording medium 80 includes a first resin layer 81, a recording layer 83 formed on the first resin layer 81, and a second resin layer 85 formed on the recording layer 83 not at the side of the first resin layer but at the other side. The surface of the first resin layer 81 and that of the second resin layer 82 of the optical recording medium 80 are each provided with a ridgy resin film 88 in the manner described in connection with FIGS. 1(a) to 1(f). That is, the ridgy resin films 88 are provided on both surfaces of the optical recording medium.

The present invention eliminates the necessity of the use of a mold in the molding of a ridgy resin film on a substrate.

What is claimed is:

1. A recording medium and having a recording layer, a disk-shaped resin layer provided on said recording layer, and a hole at the center of said resin layer, wherein:

ring-shaped first and second concaves, a resin film formation area, and a ridgy resin film provided on a surface of said resin layer, said first and second concaves are provided with a center of said hole as centers of said first and second concaves in concentric relation, said resin film formation area is constituted of a land between said first and second concaves, and said ridgy resin film is provided onto said resin film formation area and raised above said surface of said resin layer.

2. The recording medium according to claim 1, wherein said resin layer is made of a polycarbonate resin.

3. The recording medium according to claim 1, wherein said resin film formation area comprises a ridge on each of boundaries between said first concave and said resin film formation area and between said second concave and said resin film formation area.

4. The recording medium according to claim 1, wherein a height from a surface of said resin film formation area to a surface of said ridgy resin film is 3 μm or higher.

5. The recording medium according to claim 1, wherein said ridgy resin film is formed by supplying a resin liquid to a surface of the resin formation area and curing said resin liquid.

6. The recording medium according to claim 5, wherein a viscosity of said resin liquid at 25° C. is 10 mPa·s or higher and 1000 mPa·s or lower.

7. The recording medium according to claim 5, wherein a viscosity of said resin liquid at 25° C. exceeds 100 mPa·s.

8. The recording medium according to claim 5, wherein said resin liquid contains photoreactive curable resin and said photoreactive curable resin is cured by irradiation of ultraviolet rays.

9. The recording medium according to claim 1, wherein said ridgy resin film comprises a resin of a glass transition temperature which is 60° C. or higher and below 100° C.

10. The recording medium according to claim 1, wherein said ridgy resin film contains a resin selected from the group consisting of acrylic resin and epoxy resin.

11. The recording medium according to claim 10, wherein said ridgy resin film contains an acrylic resin selected from the group consisting of epoxy acrylate, urethane acrylate, ester acrylate and melamine acrylate.

12. The recording medium according to claim 10, wherein said ridgy resin film contains alicycic epoxy resin as said epoxy resin.

13. The recording medium according to claim 1, wherein a resin selected from the group consisting of polyethylene resin, acrylonitrile-butadiene-styrene and polycarbonate is used as a material of said resin layer.

14. A process for producing a recording medium molded in a form of a disk and having a recording layer, a disk-shaped resin layer provided on said recording layer, and a hole at the center of said resin layer, said process comprising the steps of:

forming ring-shaped first and second concaves on a surface of said resin layer, said first and second concaves being formed with a center of said hole as centers of said first and second concaves in concentric relation, are between said first and second concaves being a resin film formation area;

supplying a resin liquid containing a photopolymerizable resin onto said resin film formation area; and curing said resin liquid layer to give a ridgy resin film raised above said surface of said resin layer.

* * * * *